(12) United States Patent
Balleza et al.

(10) Patent No.: US 7,784,599 B2
(45) Date of Patent: Aug. 31, 2010

(54) AUTOMATIC GROUPING SYSTEM FOR FOOD PRODUCTS

(75) Inventors: Silvestre Garcia Balleza, Alizapan de Zaragoza (MX); Freddy Paulo Chan Dzib, Mexicali (MX); Joaquin Alverde Trejo, Metepec (MX)

(73) Assignee: Grupo Bimbo S.A. B. DE C.V., Mexico City (MX)

( * ) Notice: Subject to any disclaimer, the term of this patent is extended or adjusted under 35 U.S.C. 154(b) by 985 days.

(21) Appl. No.: 11/512,060

(22) Filed: Aug. 29, 2006

(65) Prior Publication Data

US 2007/0125239 A1 Jun. 7, 2007

(51) Int. Cl.
*B65G 47/26* (2006.01)
(52) U.S. Cl. .................. 198/432; 198/429; 198/458
(58) Field of Classification Search .......... 198/456, 198/458, 418.7, 429, 432
See application file for complete search history.

(56) References Cited

U.S. PATENT DOCUMENTS

| | | | | |
|---|---|---|---|---|
| 1,883,369 A | * | 10/1932 | Hardman | 198/418.1 |
| 3,486,405 A | * | 12/1969 | Schubert | 198/432 |
| 5,501,140 A | | 3/1996 | Balleza et al. | |
| 6,332,749 B1 | | 12/2001 | Garcia-Balleza et al. | |
| 6,454,518 B1 | | 9/2002 | Garcia-Balleza et al. | |
| 6,772,872 B2 | * | 8/2004 | Spangenberg et al. | 198/442 |
| 7,128,217 B2 | * | 10/2006 | Henry | 198/418.7 |
| 7,237,668 B2 | * | 7/2007 | Gamberini | 198/369.1 |
| 7,380,650 B2 | * | 6/2008 | Gamberini | 198/369.1 |

* cited by examiner

*Primary Examiner*—James R Bidwell
(74) *Attorney, Agent, or Firm*—Brinks Hofer Gilson & Lione

(57) ABSTRACT

An automated grouping system of bakery products increases a quantity of bakery products that may be fed to equipment having a larger processing capacity. The automated grouping system includes a supporting structure laterally arranged adjacent to a conveyor of bakery products. The structure includes two longitudinally-arranged lateral rails. Sliding supports, along with first linear driving actuators of regulated stroke, are mounted on the lateral rails. Each sliding support includes a vertical post and a cross guide fixed at an upper portion thereof. The structure also includes a pair of second linear vertical actuators, which support and actuate a pair of pulling plates and positioning mechanisms of bakery products. The pulling plates are also actuatable by third linear actuators of regulated stroke, which are provided on a lower cross member, to position the pulling plates in a direction transverse to a conveying direction of the bakery products.

10 Claims, 8 Drawing Sheets

AUTOMATIC GROUPING SYSTEM FOR FOOD PRODUCTS

FIELD OF INVENTION

The present invention is directed to a method and apparatus for management and handling of bakery products at various processing steps in the bakery industry. More specifically, the present invention is directed to an automated system to increase the production of bakery products.

BACKGROUND OF INVENTION

Generally, in the large scale production of bakery goods, production processes are optimized to decrease the process times, increase productivity, increase of operating speeds, and reduce production costs. To such ends, the study of large scale baking processes allows for the evaluation and optimization of each stage of the production process. Consequently, utilization of the equipment used in the production processes may also be optimized.

According to the design and implementation of some production lines, the production process may be limited by the capacity of a piece of equipment therein. For example, a piece of molding equipment may be operating at a constant level and may be connected by conveyors to another piece of equipment, such as an oven. However, the molding equipment may have a production capacity below the production capacity of the oven. Thus, the amount of product transported directly from the molding equipment or via intermediate operations is less than the production capacity of the oven. Therefore, the production process is limited by the amount of production capacity of the molding equipment. The same may happen with other equipment in other stages of other processes, such as in the case of a wrapping machine, etc.

Accordingly, there is a need in the art to have a bakery product grouping system dividing the bakery production process in several intermediate stages to permit grouping of the product to increase production numbers in order to utilize maximum use of the equipment's capacity.

OBJECTIVES OF THE INVENTION

The main objective of the present invention is an automated system that groups or gathers dough bars and/or any bakery product, either cooked or uncooked, in rows provided with increased amounts of baked products.

Another objective of the present invention is to create an automated system to group or gather dough bars and/or any bakery product, either cooked or uncooked that maximizes use of the production and operational capacity of one or more pieces of equipment within the same production line of bakery products.

An additional objective of the invention is to increase a bakery product capacity of equipment included in an automated system that groups or gathers dough bars and/or any bakery product, either cooked or uncooked.

Another objective of the present invention is to increase the rate of production of an automated system that groups or gathers dough bars and/or any bakery product, either cooked or uncooked.

A further objective of the invention is an automated system that groups or gathers dough bars and/or any bakery product, either cooked or uncooked, while also maintaining production process standards, end-product quality, as well as the market demand.

An additional objective of the invention is to decrease production costs while increasing production and process productivity of an automated system that groups or gathers dough bars and/or any bakery product, either cooked or uncooked.

Other objectives and advantages of the invention may be apparent by studying the following description and accompanying drawings, which are merely illustrative and not intended to restrict the scope of the invention in any way.

BRIEF DESCRIPTION OF THE INVENTION

In general, an automated system that groups or gathers dough bars and/or any bakery product, either cooked or uncooked, includes a supporting structure that is laterally arranged above a bakery product conveyor. The support structure also includes two longitudinally arranged side rails over which sliding supports are mounted. The support structure also includes first linear actuators of regulated stroke. The first linear actuators are capable of actuating fore and aft in a direction parallel to a conveying direction of the bakery product conveyor. Each sliding support includes a vertical post supporting a cross guide at a top thereof and a pair of second straight or vertical linear actuators which support and actuate a pair of pulling plates. The pulling plates include positioning mechanisms for positioning bakery products. The pulling plates are also moveable in a direction transverse to the conveying direction of the conveyor by third linear actuators of regulated stroke. The third linear actuators are supported in a lower cross member having bearings. The lower cross member extends between the vertical posts.

The product is centered on the conveyor in rows of a predetermined quantity. Each row from an adjacent row by a separation amount. The bakery products within a row are separated from each other in such a way that the grouping system of bakery products works in synchronized movements, which are described below.

In the idle position of the system, such pulling plates, along with the positioning mechanism, are elevated and separated close to the conveyor's edges. A sensor is provided in the supporting structure. The system executes the following movements.

In a first movement, upon the general detection of the product rows and, specifically, when the first row of product is detected, the third linear actuators position the pulling plates near a center of the conveyor so that the positioning mechanisms of each pulling plate are together at the conveyor center and allow the first row of bakery products to pass.

In a second movement, upon the detection of the second product row, the second vertical linear actuators lower the pair of pulling plates, positioning the positioning mechanisms in relation to each individual bakery product. Each pulling plate includes a predetermined number of positioning mechanisms so that the positioning mechanisms are operable to position a total number of bakery products in a row of bakery products. The number of positioning mechanisms of each pulling plate may be equal or unequal.

In a third movement, the third linear actuators position the pulling plates towards the conveyor edges across the conveyor, pulling the product with the positioning mechanisms. When the third actuators arrive at a predetermined distance in relation to the ends of the first row, the third actuators stop, and the fourth movement takes place immediately.

During the fourth movement, the first linear actuators displace the pulling plates along the conveying direction of the conveyor until the pulling plates align the bakery products being moved with the bakery products in the first row of bakery products that was allowed to pass initially.

In the fifth movement, the second linear actuators elevate the pulling plates releasing the repositioned bakery products, leaving the repositioned bakery products aligned with the first row. As a result, the number of bakery products in the first row of bakery products is increased to feed an equipment with more capacity of process.

In a sixth movement, the first linear actuators displace the pulling plates in a direction opposite to the conveying direction of the conveyor to position so that the process may be repeated cyclically and synchronically, in such a way that another row is allowed to pass (third product row) and the following row (fourth row) is separated and pulled to form another row with an increased number of bakery products.

In order to better understand the characteristics of the invention, the present description is accompanied with the illustrative, but nonlimiting, drawings, as an integral part thereof, which are described below.

Figure 1:
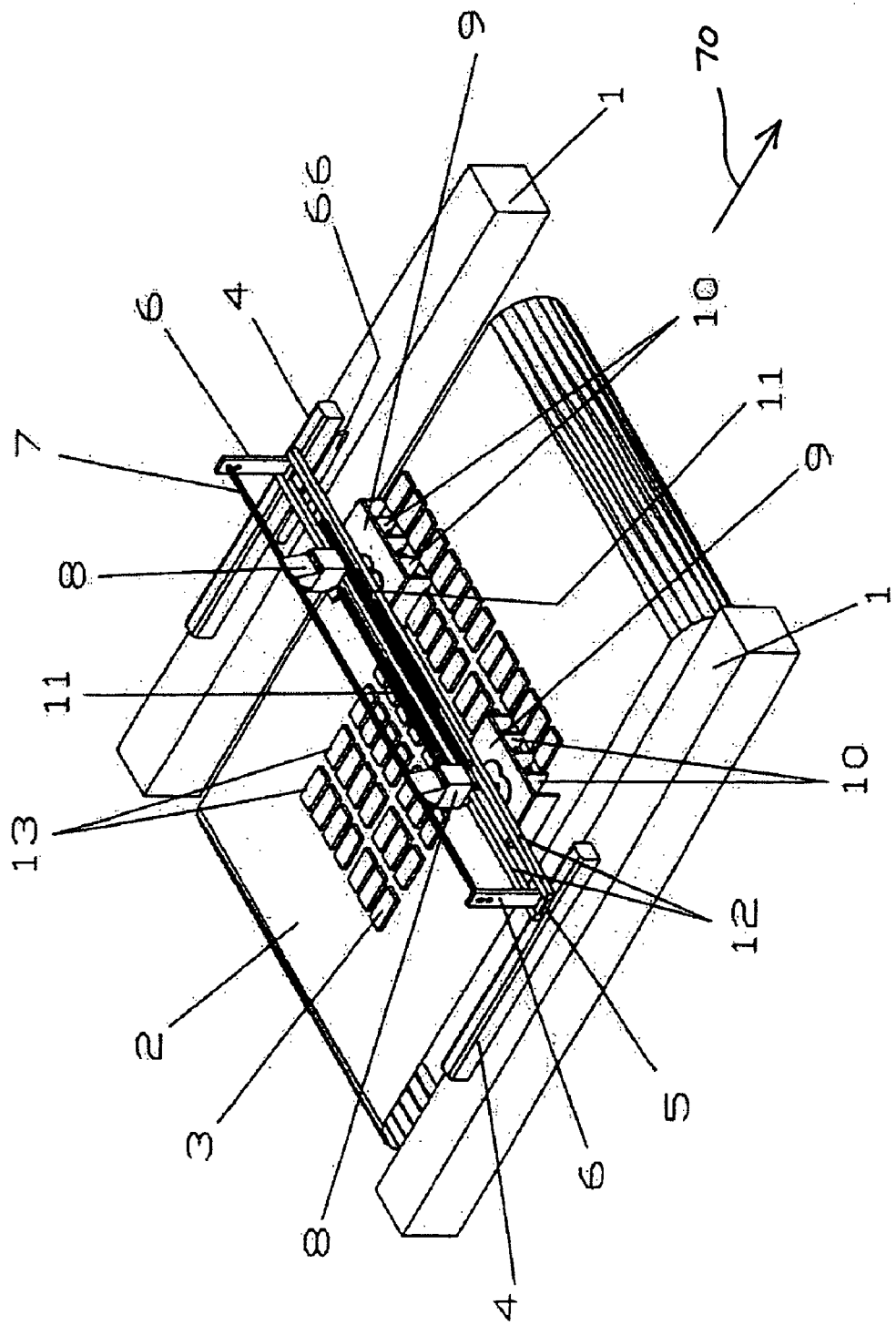
FIG. 1 shows an isometric view of an automated grouping equipment of dough bars and/or any bakery product, either cooked or uncooked.

In order to better understand the present invention, the detailed description of some implementations thereof is discussed below as illustrated in the drawings described above. However, the drawings are merely illustrative of one possible implementation and are not meant to be limiting.

DETAILED DESCRIPTION OF THE INVENTION

An implementation of the characteristic details of an automated grouping system of dough bars and/or any bakery product, either cooked or uncooked, is explained by the following description, with reference to the illustrative drawing figures. Corresponding features in the different drawing figures are identified with the same reference number.

FIG. 1 shows a perspective view of the automated grouping equipment of dough bars and/or any bakery product, either cooked or uncooked (interchangeably referred to as the "system"). The system comprises supporting structure 1 laterally arranged adjacent to a conveyor 2 of bakery products 3. The supporting structure 1 is longitudinally arranged and includes two side rails 4 on which are mounted sliding supports 5. The supporting structure 1 also includes first linear driving actuators 66 of regulated stroke capable of longitudinally displacing the sliding supports 5, both fore and aft, along a conveying direction 70 of the conveyor 2. Each sliding support 5 comprises a vertical post 6. A cross guide 7 extends between the vertical posts 6 and at a top portion thereof. The cross guide 7 slidably supports a pair of second linear vertical actuators 8, which support and actuate a pair of pulling plates 9. The pulling plates 9 include positioning mechanisms 10 for positioning bakery products 3. The pulling plates 9 are also positionable by third linear actuators 11 of regulated stroke that are supported on a lower cross member 12 with bearings for guides. The lower cross member 12 is secured to the vertical posts 6 and provides for a movement transverse to the conveying direction 70 of the conveyor 2.

The bakery products 3 are centered in cross rows 13 in a predetermined amount on the conveyor 2, with row 13 a predetermined separation distance with respect to an immediately adjacent row 13. The bakery products 3 within a row 13 are separated from each other so that the bakery product grouping system may operate in synchronized movements. The synchronized movements are described below.

Figure 2B:
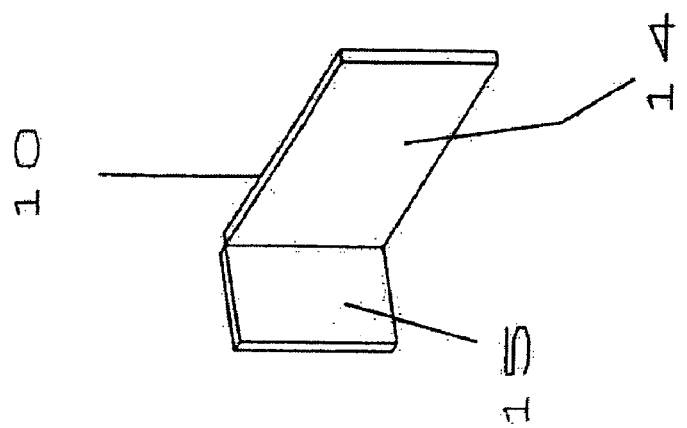
FIG. 2B illustrates a an enlarged perspective view of the positioning mechanisms of FIG. 1.
Figure 2A:
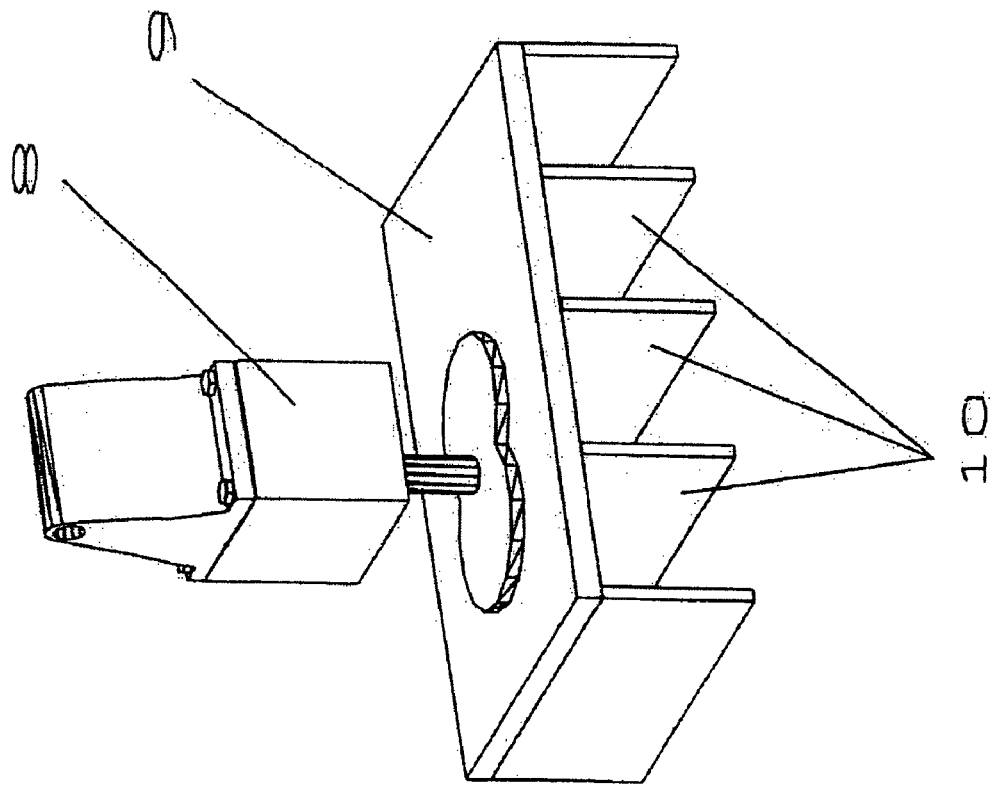
FIG. 2A illustrates an enlarged perspective view of a pulling plate with positioning mechanisms of automated grouping system of FIG. 1.

FIGS. 2A and 2B show a detailed view of a pulling plate 9 and the positioning mechanisms 10 attached thereto. The pulling plates 9 are arranged horizontally. A plurality of positioning mechanisms 10 are arranged below the pulling plates 9 and include vertical plates 14 with a back plate 15 disposed therebetween and proximal to a trailing end of the vertical plates 14. The second linear actuators 8 are secured to a top surface of each pulling plates 9. The second linear actuators 8 provide for vertical positioning of the pulling plate 9.

Figure 3:
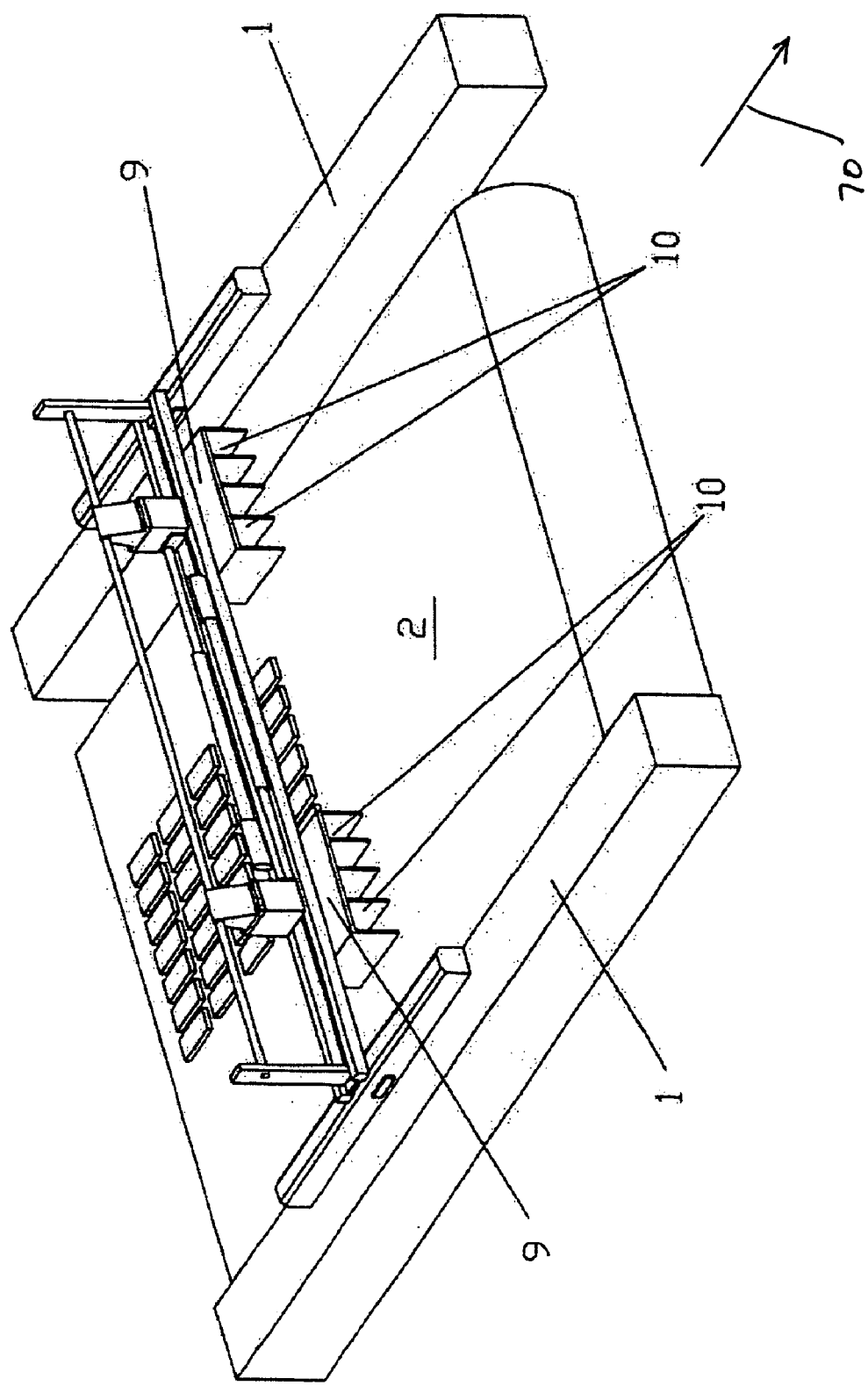
FIG. 3 illustrates a perspective view of the automated grouping equipment of dough bars and/or any bakery product, either cooked or uncooked, in an idle position.

FIG. 3 shows the automated grouping equipment in an idle position. In the idle position, the pulling plates 9 and positioning mechanisms 10 are elevated and separated near lateral sides of the conveyor. A sensor (not shown) is arranged in the supporting structure 1.

Figure 4:
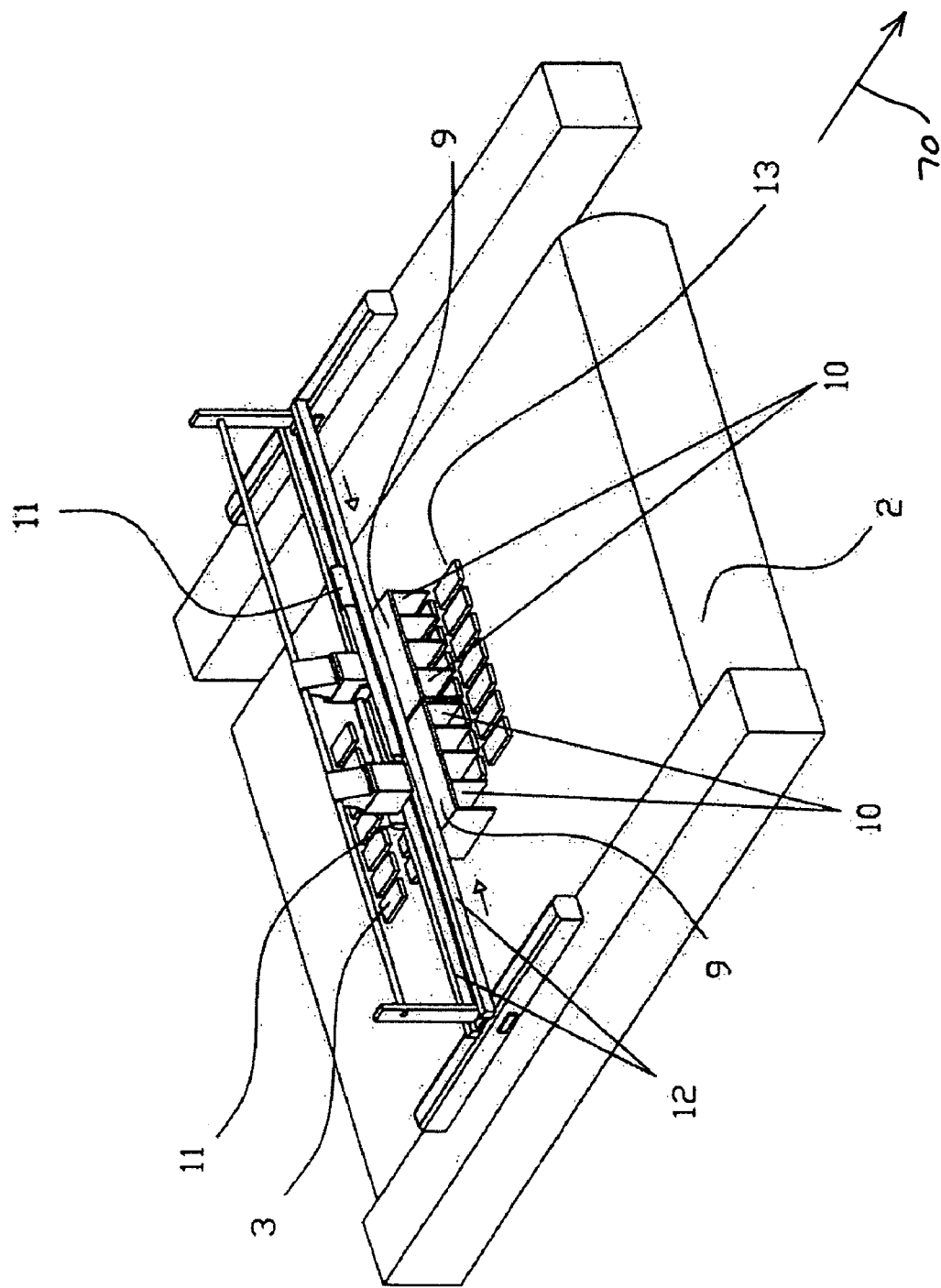
FIG. 4 illustrates a perspective view of the automated grouping equipment of FIG. 3 in a position after the first movement.

FIG. 4 shows the automated grouping equipment after the first movement. During the first movement, when the rows 13 of the bakery product 3 are generally detected and, specifically, when a first row 13 of bakery products 3 is detected, the pulling plates 9 and positioning mechanisms 10 move towards a center of conveyor 2 by actuation of the third linear actuators 11 after the first row 13 of bakery products 3 passes the positioning mechanisms 10.

Figure 5:
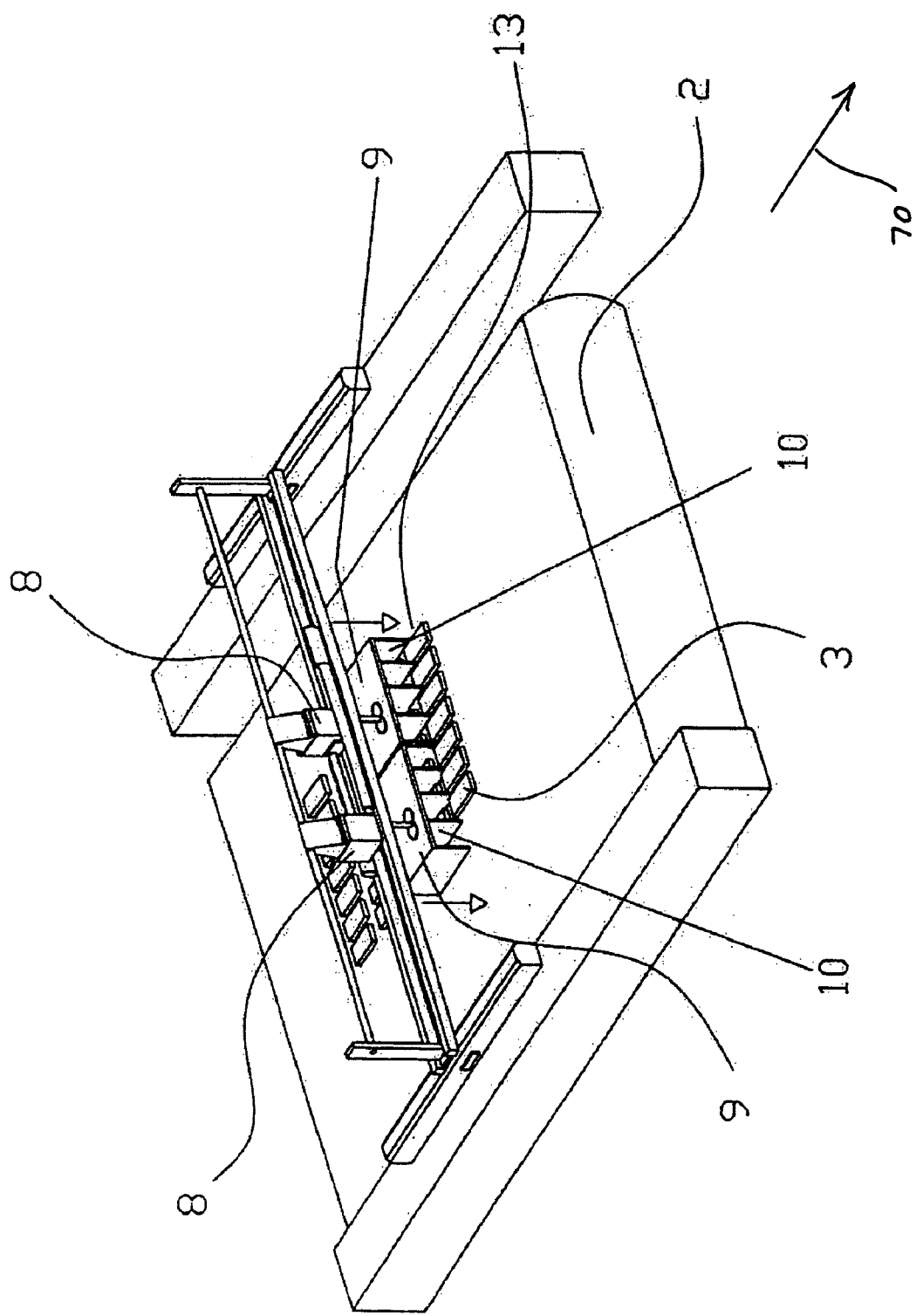
FIG. 5 illustrates a perspective view of the automated grouping equipment of FIG. 3 in a position after the second movement.

FIG. 5 shows the automated grouping equipment after the second movement. During the second movement, once a second row 13 of bakery products 3 is detected, the second linear vertical actuators 8 lower the pulling plates 9 that are centered on the conveyor 2. As a result, each positioning mechanisms 10 isolates an individual bakery product 3. Each pulling plate 9 includes a sufficient number of positioning mechanisms 10 to isolate each bakery product 3 in a row 13. The number of positioning mechanisms 10 of each pulling plate 9 may be equal or unequal so that each pulling plate 9 may position an equal number of bakery products 3 or an unequal number of bakery products 3.

Figure 6:
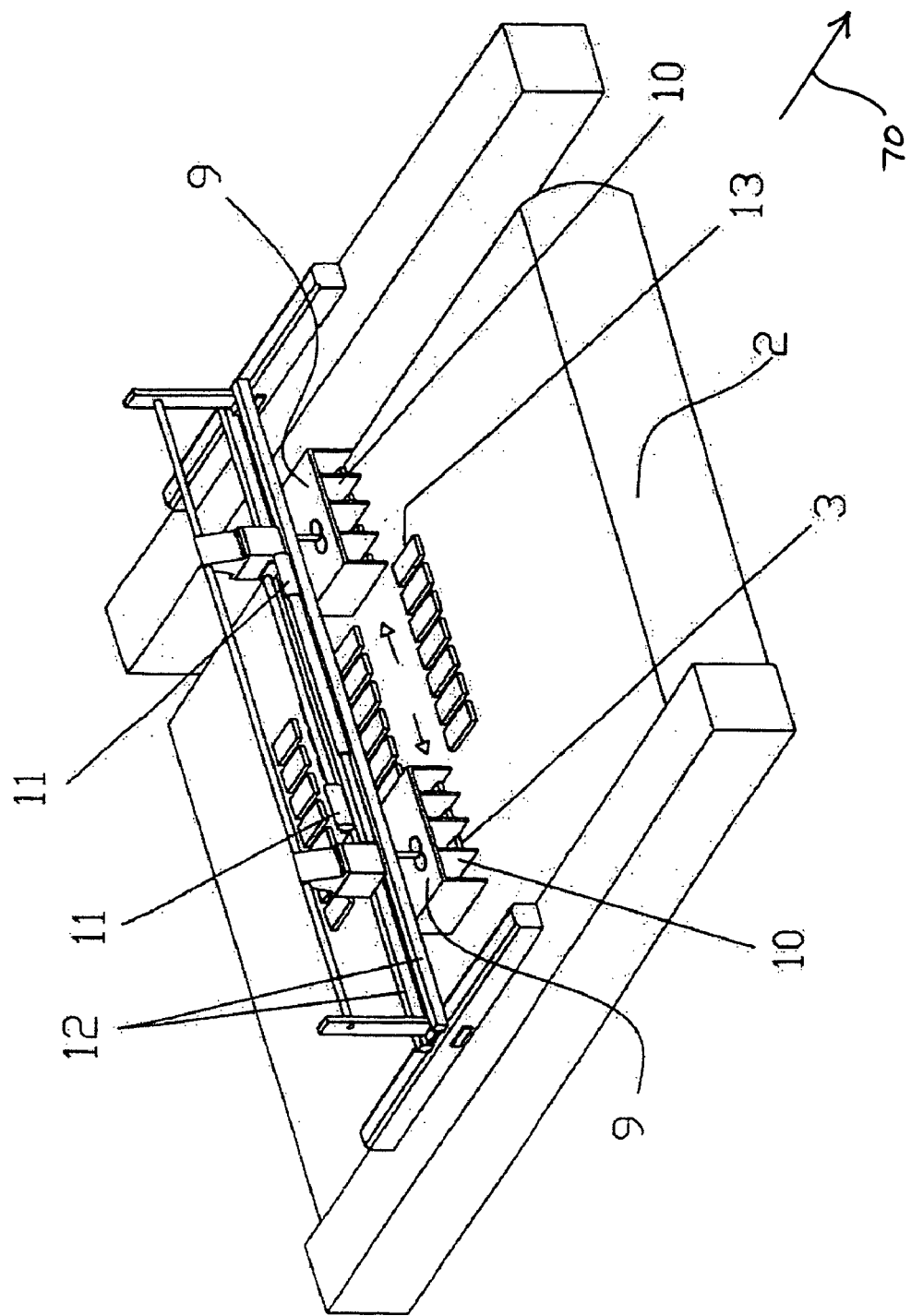
FIG. 6 illustrates a perspective view of the automated grouping equipment of FIG. 3 in a position after the third movement.

FIG. 6 shows the automated grouping equipment after the third movement. During the third movement, the third linear actuators 11 move the pulling plates 9 transversely towards the lateral sides of the conveyor 2, pulling the bakery products 3 with the positioning mechanisms 10. When the positioning mechanisms 10 are located at a predetermined distance relative to the ends of the first row of products 13 that was initially allowed to pass, the third actuators 11 stop, and the fourth movement takes place immediately.

Figure 7:
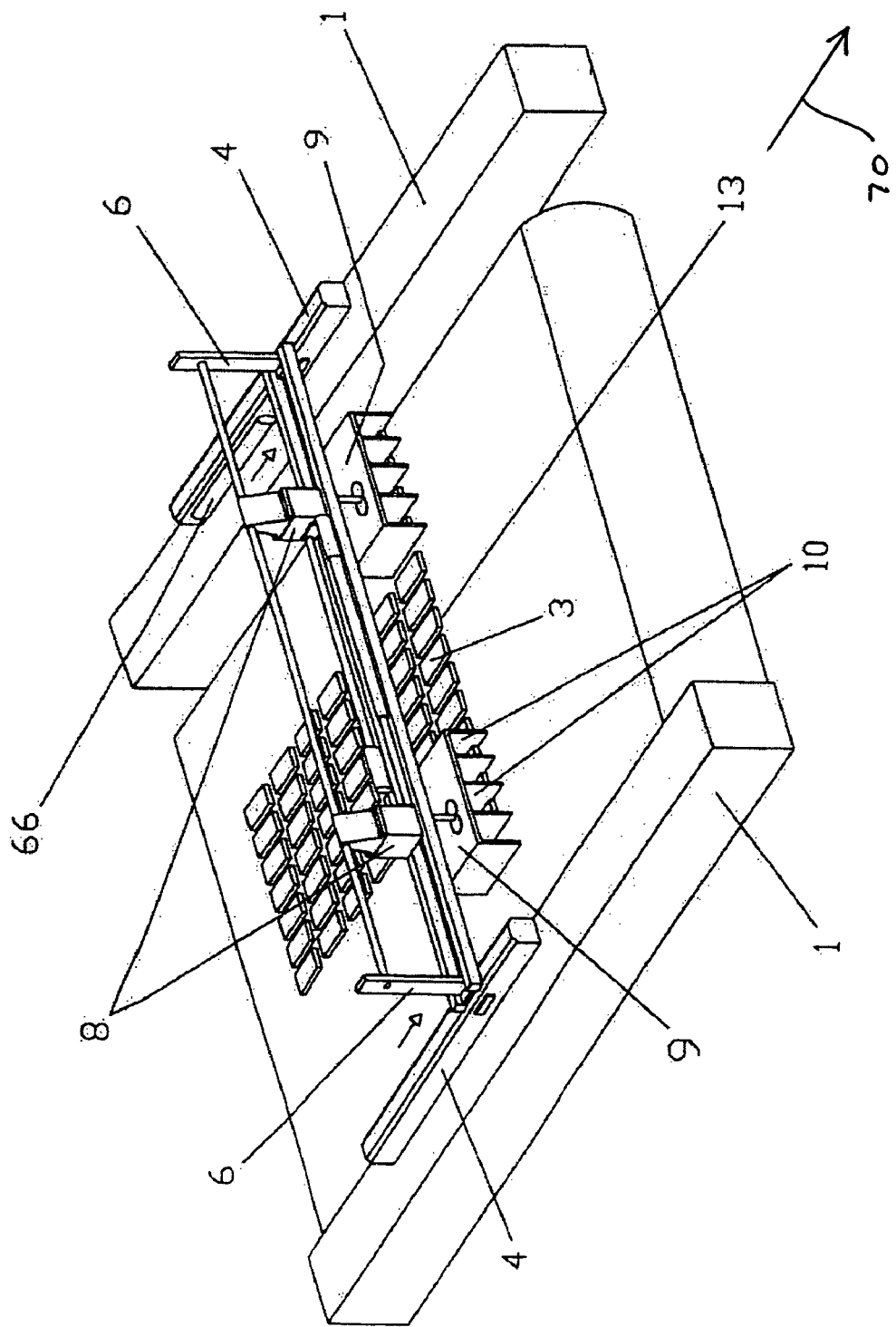
FIG. 7 illustrates a perspective view of the automated grouping equipment of FIG. 3 in a position after the fourth movement.

FIG. 7 shows the automated grouping equipment after the fourth movement. During the fourth movement, the first linear actuators 66 move the pulling plates 9 and positioning mechanisms 10 in the conveying direction 70 of the conveyor 2 so that the bakery products 3 align with the first row 13 that was initially allowed to pass.

Figure 8:
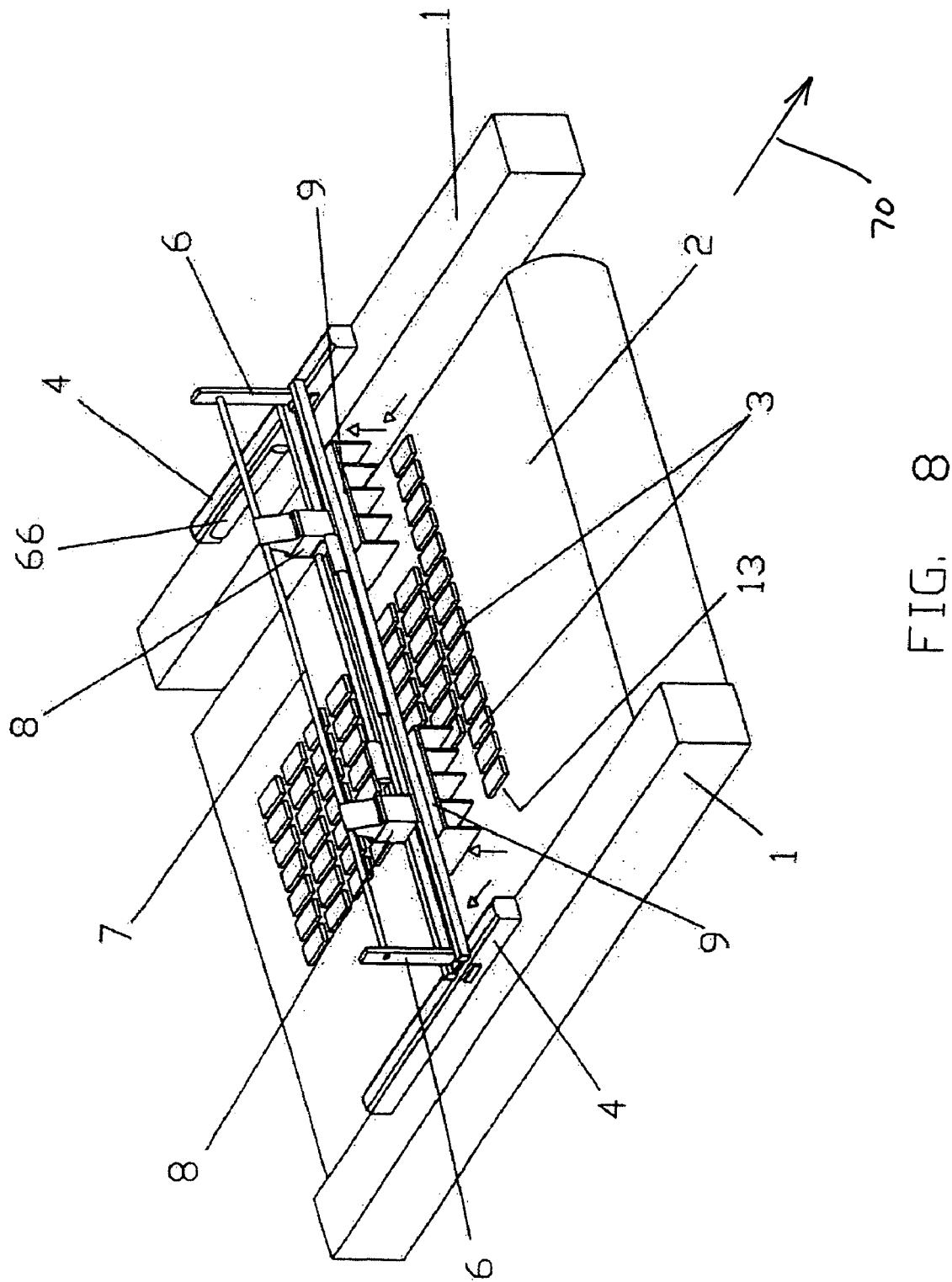
FIG. 8 illustrates a perspective view of the automated grouping equipment of FIG. 3 in a position after the fifth movement.

FIG. 8 shows the automated grouping equipment after the fifth movement. During the fifth movement, the second linear actuators 8 release the bakery products 3 so that the repositioned bakery products 3 of the second row 13 are now aligned with the first row 13. Row 13 now includes an increased number of bakery products 3, which may be fed to a piece of equipment with a higher processing capacity.

Finally, during a sixth movement, the first linear driving actuators 66 moves the pulling plates 9 in a direction opposite the conveying direction 70 of the conveyor 2, placing the pulling plates 9 back into the original starting position, as shown in FIG. 3. Thereafter, the process may be repeated in such a way that the bakery products 3 in a third row 13 are repositioned and aligned with a next row 13 (i.e., a fourth row 13 of bakery products 3).

The invention has been sufficiently described so that a person with average knowledge in the matter is able to reproduce and obtain the results mentioned herein. Additionally, it will be understood that various modifications may be made without departing from the spirit and scope of the invention. Accordingly, other implementations are within the scope of the following claims.

The invention claimed is:

1. An automated system for grouping bakery products comprising:
   a conveyor;
   a supporting structure adjacent to the conveyor, the support structure comprising:
   a first lateral rail disposed parallel to a first side of the conveyor;
   a second lateral rail disposed parallel to a second side of the conveyor opposite the first side;
   a sliding support disposed on each of the first and second lateral rails;
   first linear actuators operable to longitudinally displace the sliding supports in both a conveying direction and in a direction opposite the conveying direction;
   a vertical post attached to each sliding support;
   a cross guide extending between the vertical posts on an upper portion of said posts;
   a pair of second actuators disposed on the cross guide;
   a pulling plate attached to each second actuator, wherein the second actuators are operable to vertically position the pulling plates relative to the conveyor;
   a positioning mechanism secured to each pulling plate and operable to reposition one or more bakery products on the conveyor;
   a lower cross member extending between the vertical posts on a lower portion of said posts; and
   third linear actuators disposed on the lower cross member and operable to displace the pulling plates in a direction transverse to the conveying direction.

2. The automated system according to claim 1, wherein the system is operable to transversely align one or more bakery products from a second row of bakery products with a first row of bakery products.

3. The automated system according to claim 1, wherein the positioning mechanisms each comprise one or more compartments, wherein each compartment is adapted to receive an individual bakery product.

4. The automated system according to claim 3, wherein each compartment is defined by substantially parallel adjacent vertical plates and a vertical backing plate disposed proximate to a trailing end of the adjacent vertical plates.

5. The automated system according to claim 1 further comprising a sensor to sense the position of a row of bakery products on the conveyor.

6. A method of grouping bakery products on a conveyor comprising: detecting a first row of bakery products moving along the conveyor in a conveying direction;
   dividing a second row of bakery products;
   aligning a first portion of the bakery products of the second row at a first end of the first row of bakery products; and
   aligning a second portion of the bakery products of the second row at a second end of the first row of bakery products,
   wherein the dividing of the second row of bakery products comprises lowering a first positioning mechanism over the first portion of bakery products in the second row; and lowering a second positioning mechanism over the second portion of bakery products in the second row.

7. A method of grouping bakery products on a conveyor comprising: detecting a first row of bakery products moving along the conveyor in a conveying direction;
   dividing a second row of bakery products;
   aligning a first portion of the bakery products of the second row at a first end of the first row of bakery products; and
   aligning a second portion of the bakery products of the second row at a second end of the first row of bakery products,
   wherein the aligning of the first and second portions of bakery products comprises:
      moving the first portion of bakery products towards a first edge of the conveyor;
      moving the first portion of bakery products in the conveying direction until the first portion of bakery products aligns laterally with the first row of bakery products;
      moving the second portion of bakery products towards a second edge of the conveyor; and
      moving the second portion of bakery products in the conveying direction until the first portion of bakery products aligns with the first row of bakery products.

8. The method according to claim 7, wherein moving the first portion of bakery products towards the first edge of the conveyor occurs until an innermost bakery product of the first portion is laterally offset from an outermost bakery product at the first end of the first row of bakery products, and wherein moving the second portion of bakery products towards the second edge of the conveyor occurs until an innermost bakery product of the second portion is laterally offset from an outermost bakery product at the second end of the first row of bakery products.

9. A method for grouping bakery products utilizing an automated grouping system having a conveyor and first and second positioning mechanisms, the method comprising:
   sensing a first row of bakery products;
   laterally displacing the first and second positioning mechanisms to a center portion of the conveyor;
   passing the first row of bakery products past the first and second positioning mechanisms;
   lowering the first and second positioning mechanisms onto a second row of bakery products following the first row so that the second row is divided into a first portion of bakery products and a second portion of bakery products;

laterally displacing the first and second positioning mechanisms perpendicular to each other and proximal to opposite edges of the conveyor; and displacing the first and second positioning mechanisms in a conveying direction of the conveyor until the first portion of the bakery products aligns with the first row at a first end thereof and the second portion of bakery products aligns with the first row at a second end thereof.

10. The method according to claim 9, wherein the first and second positioning mechanisms move substantially simultaneously.

* * * * *